United States Patent [19]

Ullman et al.

[11] Patent Number: 5,120,904
[45] Date of Patent: Jun. 9, 1992

[54] ELECTRODE

[75] Inventors: Anders Ullman; Lars-Erik Bergman; Sven-Erik Bohlin, all of Ljungaverk; Pekka Heiskanen, Fränsta, all of Sweden

[73] Assignee: Permascand AB, Ljungaverk, Sweden

[21] Appl. No.: 613,547

[22] Filed: Nov. 27, 1990

[30] Foreign Application Priority Data

May 31, 1988 [SE] Sweden .................. 880208-4

[51] Int. Cl.⁵ ................ H01B 7/00; H04B 13/02
[52] U.S. Cl. ........................ 174/68.1; 174/6; 174/133 R; 340/852; 343/719; 455/40
[58] Field of Search ............ 174/68.1, 6, 129 R, 174/133 R; 204/284; 405/172; 455/40; 343/719; 307/147; 340/852

[56] References Cited

U.S. PATENT DOCUMENTS

| | | | |
|---|---|---|---|
| 4,132,084 | 1/1979 | Francisco-Arnold | 405/172 X |
| 4,464,242 | 8/1984 | Boulton | 204/284 X |
| 4,761,216 | 8/1988 | Cawlfield | 204/284 |

FOREIGN PATENT DOCUMENTS

| | | |
|---|---|---|
| 345396 | 5/1972 | Sweden . |
| 345970 | 6/1972 | Sweden . |
| 349952 | 10/1972 | Sweden . |
| 690230 | 10/1979 | U.S.S.R. .................. 405/172 |

Primary Examiner—Morris H. Nimmo
Attorney, Agent, or Firm—Burns, Doane, Swecker & Mathis

[57] ABSTRACT

Electrode used for one pole in underwater transmission of high-voltage direct current, an insulated cable being used for the other pole, such electrodes being adapted to be stationary on the bottom of the sea to serve as the anode and the cathode, respectively, while the sea-water constitutes the electric conductor therebetween. What characterises the invention is that the electrode comprises at least one layer (1) of a flexible, electrically conductive material which preferably is resistant to chlorine-alkali, said layer (1) being enclosed between protective structures (2,3) of a flexible, mechanically resistant material which preferably is resistant to chlorine-alkali, at least one protective structure (2) having openings (4) which are positioned across the surface thereof and through which the sea-water comes into contact with the layer (1).

20 Claims, 1 Drawing Sheet

ELECTRODE

The present invention is directed to an electrode which is used for one pole in underwater transmission of high-voltage direct current, an insulated cable being used for the other pole, such electrodes being adapted to be stationary on the bottom of the sea to serve as the anode and the cathode, respectively, while the sea-water constitutes the electric conductor therebetween.

The electrode is capable of withstanding a reverse reaction, and has a coating composed such that the current can flow in the opposite direction without damage to the electrode. It can also serve as a stand-by in a two-cable system, i.e. be used as the cathode. In particularly sensitive environment, the anode can be designed to produce oxygen instead of chlorine gas, i.e. it has a large excess voltage for chlorine gas.

For transmission of power in the order of 500 MW from coast to coast, it is customary to use high-voltage direct current for several reasons, such as lower installation costs, and because the use of direct current makes it possible to connect two non-synchronised A.C. mains with each other, independently of the frequency of the mains. In a feed station connected to a high-voltage A.C. mains, the A.C. voltage is rectified to about 400 kV D.C. Then the direct current which is about 1.2 kA, is conducted through an insulated cable on the bottom of the sea, while the return is effected through the sea-water between electrodes (anode and cathode) mounted on the bottom of the sea at each coast. The receiving station converts direct current to alternating current of any desired voltage. Since only one cable is used, the losses which are always caused by the line resistance, are reduced to a considerable extent.

Connecting, as the electrode, magnetite rods to the power conductor, is prior art. Also graphite electrodes are used, which are enclosed in permeable bags containing coke, with finer coke fractions adjacent the electrode. In this manner, a larger electrode surface is obtained. However, the active surfaces of prior art electrodes are comparatively small, which causes considerable power losses. Further, rational handling and adequate securing of the prior art electrodes to the bottom of the sea are not possible.

The object of the present invention is to provide an electrode for transmission of high-voltage direct current, said electrode having a substantially larger projected surface against the surrounding sea-water so as to reduce the power losses.

A further object is to provide an electrode which is comparatively easily transported, installed and secured and which, in the installed state, substantially follows the contours of the sea bottom.

A still further object is to provide an electrode which is protected against mechanical damage, both when being transported and secured, and when in use, and which is resistant to the environment.

According to the invention, these objects are achieved in that the electrode comprises at least one layer of a flexible, electrically conductive material which preferably is resistant to chlorine-alkali, said layer being enclosed between protective structures of a flexible, mechanically resistant material which preferably is resistant to chlorine-alkali, at least one protective structure having openings which are positioned across the surface thereof and through which the sea-water comes into contact with said layer.

Further developments of the invention are stated in the subclaims.

A preferred embodiment of the invention will be described below with reference to the accompanying drawing in which.

The electrode comprises a layer 1 of a flexible, electrically conductive material which is resistant to chlorine-alkali. The layer 1 may have the shape of a thin, perforated metal sheet, an expanded metal sheet or a wire netting. However, it is essential that the layer has openings such that, in the installed state of the electrode, the surrounding sea-water may flow freely through the layer. If desired, e.g. for increased flexibility, two or more layers may be used instead of one layer 1.

Suitable materials for the layer 1 are, for example, titanium, titanium alloys and coated titanium, the coating being such that the electrode may serve both as the anode and as the cathode, also at low temperatures and low salinity. As examples of such coating on a titanium netting, mention is made of precious metal oxides or mixtures thereof which are stated in Swedish Patents 345,396, 345,970 and 349,952, or other coatings based on oxides or metals. Coated titanium netting which is available under the trademark ELGARD 150 Anode Mesh and ELGARD 210 Anode Mesh can also be conveniently used. One advantage of using netting structures is that the (projected) surface is increased and thus the losses of contraction are reduced. These losses refer to the sectional area of the current field between the anode and the cathode, a larger surface yielding smaller losses.

Conductive bands or bars are welded to the layer 1 or the layers, said bands or bars being hermetically connected to the copper core of the power conductor (not shown).

The layer 1 is enclosed between protective structures 2 and 3 of a flexible, mechanically resistant material which is resistant to chlorine-alkali. Examples of suitable materials are polyolefins and fluorine-substituting materials. Each of the structures 2, 3 has a projected surface which is substantially the same size as that of the layer 1, and said structures are adapted to protect the conductive layer against mechanical damage, both when the electrode is being transported and secured and when in use. Thus, the structure 3 is adapted to protect the layer 1 against damage that could be caused by the bottom of the sea, and the structure 2 is adapted to protect against any objects and tools dropped into the sea as well as against securing means when consisting of blocks of stone or concrete which are adapted to the electrode.

The lower structure 3 may have the shape of a continuous mat, with or without openings, while the upper structure may have the shape of a mat with openings which are substantially uniformly spaced apart across the surface thereof. Through the openings, the sea-water is in contact with the layer 1. The structure 2 preferably comprises a plurality of parallel tubular means connected with each other and arranged in a predetermined spaced-apart relationship.

Figure 1:
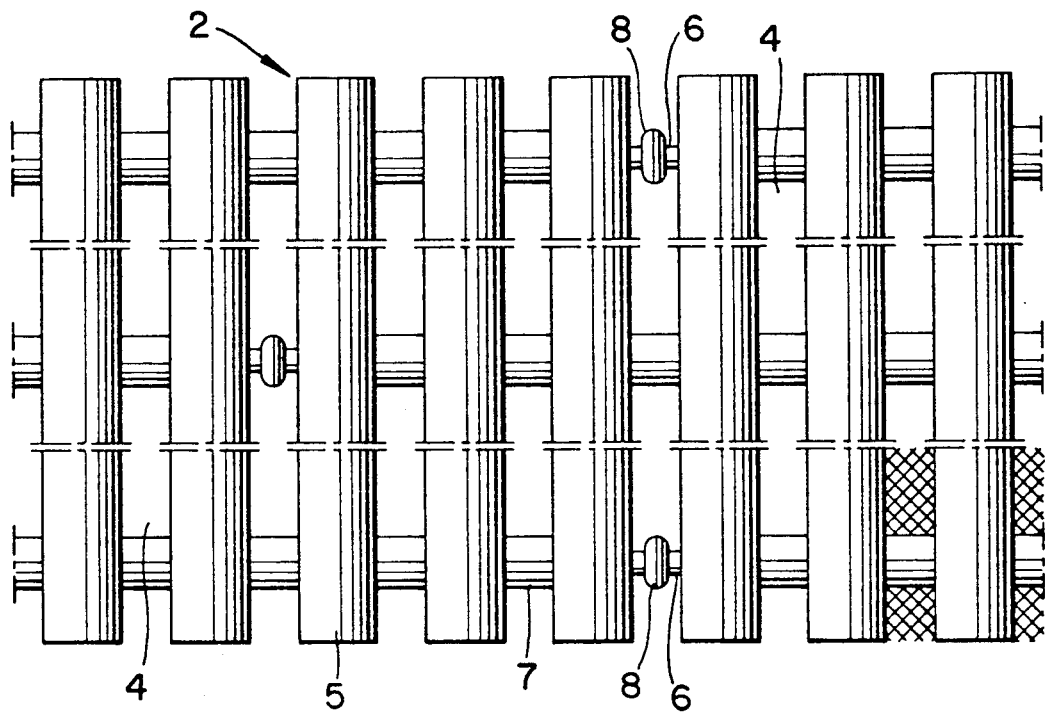
FIG. 1 is a top plan view of an electrode according to the invention.
Figure 2:
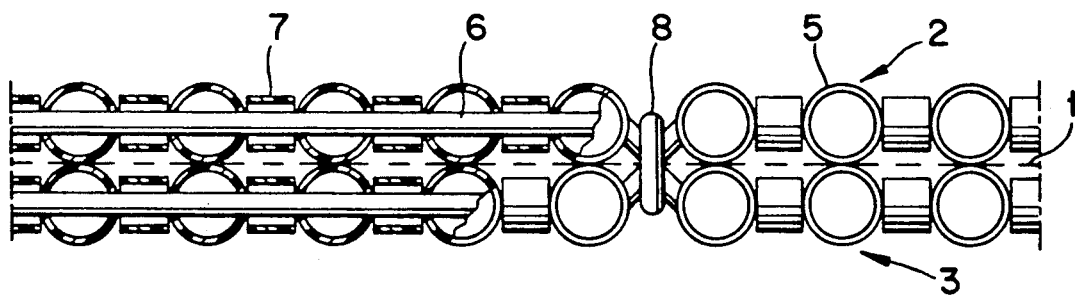
FIG. 2 is a part-sectional side view of the electrode shown in FIG. 1.

In a preferred embodiment as shown in FIGS. 1 and 2, the upper structure 2 comprises separate tubular means 5 which are interconnected by rope-shaped attachment means 6. The structure comprises at least two attachment means 6, preferably three or more, which are arranged perpendicular to and extend through said tubular means 5. Between most of the neighbouring means 5, spacer members 7 are preferably, but not necessarily, arranged, through which the attachment means 6 extend. Of course, the lower structure 3 may be of the same design as the upper structure 2, as shown in FIG. 2.

The two structures 2, 3 which enclose the layer 1, are interconnected by connecting means 8 which are, between two pairs of tubular means 5, engaged with the attachment means 6 which are in alignment with each other, said two pairs of tubular means 5 having no intermediate spacer members 7.

All the means 5-8 included in the structures 2 and 3 are made of materials resistant to chlorine-alkali, such as polyolefins, fluorine-substituting materials or the like, since the electrode is intended to serve as the anode or, alternatively, the cathode, for which reason the electrode environment contains chlorine gas or is alkaline.

Since both the layer 1 (or the layers) and the structures 2 and 3 are flexible, the electrode can be stored and transported in a rolled-up state, which facilitates the handling thereof, especially since the projected surface can be extremely large, up to several thousand m². The design also implies that the electrode is comparatively easily placed on the bottom of the sea by being unrolled. The flexibility of the electrode also allows it to largely follow the contours of the bottom of the sea.

Moreover, the electrode can be secured to the bottom of the sea by blocks of stone or concrete attached to the electrode. Alternatively, one or both structures 2 and 3 may be provided with sinkers (not shown), especially when securing by means of blocks is not practicable. For the purpose of securing, it is also possible to fill some of the tubular means 5 with concrete or like material.

The electrode according to the invention is intended for high-voltage direct current, for example 1.2 kA when transmitting a voltage of 400 kV, and has an extremely large surface, as stated above. For practical reasons, the electrode is manufactured in modules of about 10-30 m², which are laid out and joined together so as to form multiples. The size of the multiples (in some cases, they can be very large) is determined according to the circumstances. The large surface not only reduces transmission losses as compared to prior art technique; it also reduces the inconvenience of chlorine production as compared to other designs, owing the large surface of the anode.

The coating is operative also when the electrode is sunk into gravel, mud etc.

The active surface of the electrode can be increased in that a layer of a conductive substance, e.g. crushed graphite, is applied above and/or below said layer in the immediate vicinity thereof.

The invention is not limited to that described above and shown in the drawing, but can be modified in several ways within the scope of the appended claims.

We claim:

1. An electrode used for one pole in underwater transmission of high-voltage direct current, an insulated cable being used for the other pole, both the electrode and the other pole being adapted to be stationary on the sea bottom to serve as the anode and the cathode, respectively, while the sea-water constitutes the electric conductor therebetween, wherein the electrode comprises at least one layer of a flexible, electrically conductive material resistant to chlorine-alkali, said at least one layer being enclosed between protective structures of a flexible, mechanically damage-resistant and chlorine-alkali resistant material, at least one of the protective structures having a plurality of openings positioned across the surface thereof and through which sea water can come into contact with said at least one layer, and wherein the electrode is resistant to damage when placed on the sea bottom.

2. The electrode as claimed in claim 1, wherein the said at least one layer comprises a perforated metal sheet.

3. The electrode as claimed in claim 1, wherein the said at least one layer comprises an expanded metal sheet.

4. The electrode as claimed in claim 1, wherein the said at least one layer comprises a wire netting.

5. The electrode as claimed in claims 2, wherein the said at least one layer comprises titanium, a titanium alloy or coated titanium.

6. The electrode as claimed in claim 5, wherein the said at least one layer comprises coated titanium, the coating on the titanium comprising a precious metal or some other suitable catalytic coating comprising a metal, a metal oxide or a mixture thereof.

7. The electrode as claimed in claims 2, wherein at least one of the protective structures comprises a plurality of interconnected, spaced-apart tubular means extending in parallel.

8. The electrode as claimed in claim 5, wherein at least one of the protective structures comprises a plurality of interconnected, spaced-apart tubular means extending in parallel.

9. The electrode as claimed in claim 6, wherein at least one of the protective structures comprises a plurality of interconnected, spaced-apart tubular means extending in parallel.

10. The electrode as claimed in claim 7, wherein spacer members are positioned between at least some of the tubular means, and wherein the tubular means and spacer members are connected by rope-shaped, through attachment means.

11. The electrode as claimed in claim 8, wherein spacer members are positioned between at least some of the tubular means, and wherein the tubular means and spacer members are connected by rope-shaped, through attachment means.

12. The electrode as claimed in claim 9, wherein spacer members are positioned between at least some of the tubular means, and wherein the tubular means and spacer members are connected by rope-shaped, through attachment means.

13. The electrode as claimed in claim 10, wherein the protective structures are interconnected by connecting means.

14. The electrode as claimed in claim 13, wherein the connecting means, spacer members, and attachment means are constructed of materials resistant to chlorine-alkali.

15. The electrode as claimed in claim 14, wherein the connecting means, spacer members, and attachment means comprise polyolefins or fluorine-substituted materials.

16. The electrode as claimed in claim 1, wherein at least one protective structure comprises sinkers.

17. The electrode as claimed in claim 1, wherein at least a portion of the tubular means in said electrode are filled with concrete or a similar material.

18. The electrode as claimed in claim 1, the electrode having an active surface formed with a conductive, surface-enhancing substance, said substance applied above and/or below said at least one layer and in contact with said at least one layer.

19. A method for transmitting high-voltage direct current via an electrode comprising at least one layer of a flexible electrically conductive material resistant to chlorine-alkali, said layer being enclosed between protective structures of a flexible, mechanically damage-resistant material resistant to chlorine-alkali, at least one of said protective structures having openings which are positioned across the surface thereof,
wherein the method comprises the steps of:
contacting the at least one layer of the electrode with sea water, the electrode consitituting a first electrical pole, contacting a second electrical pole with the sea water, passing high voltage direct current through the first and second poles, the sea water acting as an electric conductor between the first and second poles.

20. A device for underwater transmission of high-voltage direct current in which sea water serves as an electric conductor, the device comprising an insulated cable as the other conductor and an electrode comprising at least one layer of a flexible electrically conductive material resistant to chlorine-alkali, said layer being enclosed between protective structures of a flexible, mechanically damage-resistant material resistant to chlorine-alkali, at least one protective structure having openings which are positioned across the surface thereof and through which sea-water can come into contact with said layer.

* * * * *